United States Patent [19]

North

[11] Patent Number: 4,589,197

[45] Date of Patent: May 20, 1986

[54] COMPOSITE CATHODE FOR ELECTROCHEMICAL CELL

[75] Inventor: John M. North, Newbury, England

[73] Assignee: United Kingdom Atomic Energy Authority, London, England

[21] Appl. No.: 726,661

[22] Filed: Apr. 24, 1985

[30] Foreign Application Priority Data

May 14, 1984 [GB] United Kingdom ............... 8412304

[51] Int. Cl.$^4$ ..................... H01M 4/62; H01M 6/18
[52] U.S. Cl. ................. 29/623.1; 429/192; 429/217
[58] Field of Search ............. 429/192, 217; 29/623.1

[56] References Cited

U.S. PATENT DOCUMENTS 4,303,748  12/1981  Armand et al. ............... 429/192
4,477,545  10/1984  Akridge et al. ............... 29/623.1

Primary Examiner—Donald L. Walton
Attorney, Agent, or Firm—Larson and Taylor

[57] ABSTRACT

A composite cathode for a solid state electrochemical cell is made by forming a sheet or film from a solution of an insertion electrode material (e.g. $V_6O_{13}$) and a polymeric material (e.g. $(PEO)_xLiF_3CSO_3$), e.g. by solution casting. The sheet or film is subjected to densification by application of pressure thereto (e.g. by rolling) and assembled into a cell in conjunction with an anode having lithium as its active material and an electrolyte comprising a polymeric material capable of forming a complex with a Li salt, a Li salt being complexed with a polymeric material to form an ionically conducting phase in one or both of the composite cathode and the electrolyte. The overall volumetric energy density and capacity retention of the cell are thereby enhanced.

3 Claims, No Drawings

COMPOSITE CATHODE FOR ELECTROCHEMICAL CELL

This invention relates to a method of making a composite cathode and its incorporation into a solid state electrochemical cell.

A solid state electrochemical cell comprising a Li or Li-based anode, a lithium ion conducting polymeric electrolyte, and a cathode based on an insertion electrode material such as $V_6O_{13}$, $V_2O_5$ or $TiS_2$ is known. See, for example, European Patent Specification No. 0013199. (corresponding to U.S. Pat. No. 4,303,748). In order to achieve high active cathode utilizations at realistic current densities, the cathode may be constructed, as described in the above-mentioned specification, as a composite structure comprising the insertion electrode material (active catholyte), the polymer electrolyte and, if required, an electronically conducting medium such as graphite. Examples of preferred proportions are: 20% to 70% polymer electrolyte, 30% to 80% active catholyte and, if required, 1% to 20% of an electronically conducting medium, where all percentages are by volume.

It is also known to prepare such a composite cathode in sheet or film form from a solution of the cathode components in a suitable solvent, e.g. acetonitrile. For example, the solution may be cast onto a current collector and the solvent allowed to evaporate to give a sheet or film of the composite cathode on the current collector.

This invention is concerned with the manufacture of such a composite cathode to improve its performance in a solid state electrochemical cell.

The invention provides a method of making a solid state electrochemical cell comprising the steps of (a) making a composite cathode therefor by forming a sheet or film from a solution in a solvent therefor of an insertion electrode material (or similarly active material) and of a polymeric material capable of forming a complex with a Li salt, and subjecting the sheet or film to sufficient pressure to cause densification thereof; and (b) assembling a cell comprising the composite cathode, an anode having lithium as its active material and an electrolyte comprising a polymeric material capable of forming a complex with a Li salt, a Li salt being complexed with the polymeric material to form an ionically conducting phase in one or both of the composite cathode and the electrolyte.

Cells made by the method of the invention have been found to have increased overall volumetric energy density compared with cells made by known methods, i.e. where the composite cathode has not been densified. This is due, it is believed, to enhancement of the volumetric specific capacity of the composite cathode by densification. Increases by a factor of two in overall volumetric energy density have been obtained in specific cases which suggests that composite cathodes prepared without densification may only have about 50% of theoretical density.

It has been further found that cells fabricated according to the invention have improved cycling behaviour in respect of enhanced capacity retention as will be illustrated in the example herein.

The composite dcathode may contain, as an insertion electrode material, a material known in the art such as mentioned above and, as a polymeric material, a material such as poly(ethylene oxide) (referred to herein as PEO) or poly(propylene oxide) (referred to herein as PPO). The composite cathode may be formed with a lithium ion conducting phase constituted by a lithium salt the anion of which may, for example, be $I^-$, $Br^-$, $ClO_4^-$, $SCN^-$ or $F_3CSO_3^-$ present as a complex with the or part of the polymeric material. If such a lithium ion conducing phase is not provided, additional treatement is necessary to render the cell operable as discussed below. The composite cathode may also contain, if required, an electronically conducting medium such as graphite or other form of carbon.

Densification of the composite cathode may, for example, be carried out by rolling at ambient or higher temperatures and may be carried out on a current collector (e.g. in the form of a metal foil substrate) when the sheet or film has been formed thereon in step (i).

Step (b) may be carried out by methods known in the art, for example by stacking, rolling or folding into a required configuration and containment within a suitable cell casing. The polymeric electrolyte may be PEO or PPO as mentioned above and may be in the form of a complex with a Li salt to form an ionically conducting phase. The cell is operable where both the electrolyte and the composite cathode possess an ionically conducting phase. The cell is, however, inoperable when one only of the electrolyte and the composite cathode possesses an ionically conducting phase and, in such cases, the cell may be rendered operable by causing diffusion of said phase from one of the electrolyte and the composite cathode to the other of the electrolyte and the composite cathode, e.g. by heat treatment, as described in UK Patent Specification No. 2 139 410 A.

One way of carrying out the invention will now be described, by way of example only, as follows:

EXAMPLE

A solution of $(PEO)_9$ $LiF_3CSO_3$ and $V_6O_{13}$ in acetonitrile was prepared and acetylene black incorporated therein. The resulting liquid was applied to a nickel foil current collector by a "doctor-blade" technique and the acetonitrile allowed to evaporate leaving a flim of $\sim 50$ $\mu m$ thickness and of volume composition 22.5% $V_6O_{13}$, 25% polymer, 2.5% carbon and 50% porosity. The film (on the current collector) was then passed through the nip of two rollers in order to effect densification by substantial removal of the porosity.

The resulting film (on the current collector) was assembled, as a composite cathode, into an electrochemical cell together with a Li metal foil anode ($\sim 300$ $\mu m$ thickness and a $(PEO)_9$ $LiF_3CSO_3$ electrolyte ($\sim 50$ $\mu m$ thickness). The cell was tested under the following conditions: 130° C., 0.25 $mAcm^{-2}$ discharge current, 0.125 $mAcm^{-2}$ charge current between 1.7 V and 3.25 V, nominal capacity 1.25 mAh $cm^{-2}$. It was found to retain 80% of theoretical capacity after 30 cycles.

By way of comparison, a cell identical to the above cell in all respects except that the film had not been subjected to densification was tested under the same conditions. The comparison cell was found to retain 60% of theoretical capacity after 30 cycles.

I claim:

1. A method of making a solid state electrochemical cell comprising the steps of (a) making a composite cathode therefore by forming a sheet or film from a solution in a solvent therefore of an insertion electrode material and of a polymeric material capable of forming a complex with a Li salt, and rolling the sheet or film at sufficient pressure to cause densification thereof; and (b) assembling a cell comprising the composite cathode, an anode having lithium as its active material and an electrolyte comprising a polymeric material capable of forming a complex with Li salt, a Li salt being complexed with the polymeric material to form an ionically conducting phase in one or both of the composite cathode and the electrolyte.

2. A method as claimed in claim 1 wherein the sheet or film is rolled in step (a) by passing the sheet or film through a nip between rollers.

3. A method as claimed in claim 2 wherein the sheet or film is carried on a current collector substrate.

* * * * *